United States Patent
Bansal et al.

(10) Patent No.: US 9,634,936 B2
(45) Date of Patent: Apr. 25, 2017

(54) SERVICE CHAINING ACROSS MULTIPLE NETWORKS

(71) Applicant: Juniper Networks, Inc., Sunnyvale, CA (US)

(72) Inventors: Sachin Bansal, Fremont, CA (US); Nischal Sheth, Los Altos, CA (US); Prakash M. Bailkeri, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 142 days.

(21) Appl. No.: 14/320,079

(22) Filed: Jun. 30, 2014

(65) Prior Publication Data
US 2015/0381493 A1    Dec. 31, 2015

(51) Int. Cl.
| | | |
|---|---|---|
| H04L 12/741 | (2013.01) | |
| H04L 12/725 | (2013.01) | |
| H04L 12/721 | (2013.01) | |
| H04L 12/56 | (2006.01) | |
| H04L 12/723 | (2013.01) | |

(52) U.S. Cl.
CPC ............ *H04L 45/745* (2013.01); *H04L 45/30* (2013.01); *H04L 45/306* (2013.01); *H04L 45/38* (2013.01); *H04L 45/741* (2013.01); *H04L 45/50* (2013.01)

(58) Field of Classification Search
CPC ....... H04L 45/745; H04L 45/50; H04L 45/38; H04L 45/30; H04L 45/741
See application file for complete search history.

(56) References Cited

U.S. PATENT DOCUMENTS

| | | | | |
|---|---|---|---|---|
| 8,422,502 | B1* | 4/2013 | Alaettinoglu | H04L 45/38 370/392 |
| 2003/0016672 | A1* | 1/2003 | Rosen | H04L 12/4645 370/392 |
| 2005/0188106 | A1* | 8/2005 | Pirbhai | H04L 45/54 709/238 |
| 2006/0291445 | A1* | 12/2006 | Martini | H04L 45/50 370/351 |

(Continued)

FOREIGN PATENT DOCUMENTS

WO    2013/184846 A1    12/2013

OTHER PUBLICATIONS

Search Report from counterpart European Application No. 15174107.1, dated Jan. 8, 2016, 12 pp.
(Continued)

*Primary Examiner* — Chandrahas Patel
*Assistant Examiner* — Lan Huong Truong
(74) *Attorney, Agent, or Firm* — Shumaker & Sieffert, P.A.

(57) ABSTRACT

In some examples, a controller comprises one or more processors; a control unit configured to obtain, from a router in a first network, a route that specifies a next hop to an address prefix reachable by the first network; and a service chain unit configured to generate a modified route that specifies a service node as the next hop for the address prefix, wherein the service node is external to the first network, and wherein the control unit is further configured to send the modified route to a second network, the modified route marked with an import route target configured for a provider edge router of the second network so that traffic from the first network and destined for the second network is forwarded to the service node.

20 Claims, 7 Drawing Sheets

(56) References Cited

U.S. PATENT DOCUMENTS

| | | | | |
|---|---|---|---|---|
| 2007/0008880 | A1* | 1/2007 | Buchko | H04L 45/00 370/218 |
| 2007/0258372 | A1* | 11/2007 | Nadeau | H04L 43/026 370/235 |
| 2008/0101385 | A1* | 5/2008 | Elias | H04L 45/02 370/401 |
| 2010/0027549 | A1* | 2/2010 | Satterlee | H04L 12/4641 370/395.31 |
| 2011/0142053 | A1* | 6/2011 | Van Der Merwe | H04L 47/72 370/395.1 |
| 2011/0286466 | A1* | 11/2011 | Ge | H04L 45/04 370/401 |
| 2013/0003735 | A1 | 1/2013 | Chao et al. | |
| 2013/0182710 | A1* | 7/2013 | Scholl | H04L 45/02 370/392 |
| 2014/0050223 | A1 | 2/2014 | Foo et al. | |
| 2014/0198794 | A1* | 7/2014 | Mehta | H04L 45/74 370/392 |
| 2015/0009806 | A1* | 1/2015 | Bashandy | H04L 41/0654 370/221 |

OTHER PUBLICATIONS

Bitar et al., "Interface to the Routing System (I2RS) for Service Chaining: Use Cases and Requirements," Internet Engineering Task Force, Jul. 15, 2013, 15 pp.

Jiang et al., "An Architecture of Service Function Chaining," Internet Working Group, Feb. 14, 2014, 12 pp.

Quinn et al., "Service Function Chaining—Creating a Service Plane Using Network Service Header (NSH)," IEEE, Dec. 1, 2014, 20 pp.

Zhang et al., "StEERING: A Software-Defined Networking for Inline Service Chaining," 21st IEEE International Conference on Network Protocols, Oct. 7, 2013, 10 pp.

"Policy and Charging Control (PCC), Reference Points (Release 11)," 3GPP TS 29.212—Version 11.7.0, 3rd Generation Partnership Project, Technical Specification Group Core Network and Terminals, Dec. 2012, 196 pp.

"Policy and Charging Control Architecture (Release 10)," 3GPP TS 23.203—Version 10.1.0, 3rd Generation Partnership Project, Technical Specification Group Services and System Aspects, Sep. 2010, 131 pp.

U.S. Appl. No. 61/973,045, filed Mar. 31, 2014 and entitled High-Performance, Scalable and Drop-Free Data Center Switch Fabric.

Rosen, "BGP/MPLS IP Virtual Private Networks (VPNs)," Network Working Group, RFC 4364, Feb. 2006, 47 pp.

Fernando et al, "Virtual Topologies for Service Chaining in BGP/IP MPLS VPNs," draft-rfernando-I3vpn-service-chaining-03, Internet Draft, Oct. 18, 2013, 15 pp.

Bates et al., "Multiprotocol Extensions for BGP-4," Network Working Group, RFC 2858, Jun. 2000, 23 pp.

Patel, "BGP vector routing," draft-patel-raszuk-bgp-vector-routing-03, Network Working Group, Internet-draft, Apr. 21, 2014, 12 pp.

Kompella et al., "Signaling Virtual Machine Activity to the Network Virtualization Edge," draft-kompella-nvo3-server2nve-02, Network Working Group, Internet-draft, Apr. 29, 2013, 19 pp.

Response to Communication pursuant to Rule 69 EPC dated Feb. 1, 2016, from counterpart European Application No. 15174107.1, filed Jul. 14, 2016, 3 pp.

* cited by examiner

SERVICE CHAINING ACROSS MULTIPLE NETWORKS

TECHNICAL FIELD

The invention relates to computer networks and, more specifically, to applying network services to network traffic traversing computer networks.

BACKGROUND

A computer network is composed of a set of nodes and a set of links that connect one node to another. For instance, a computer network may be composed of a set of routers while the set of links may be cables between the routers. When a first node in the network sends a message to a second node in the network, the message may pass through many links and many nodes. The set of links and nodes that the message passes through while traveling from the first node to the second node is referred to as a path through the network.

A network operator may deploy one or more network devices to implement service points that apply network services such as firewall, carrier grade network address translation (CG-NAT), performance enhancement proxies for video, transport control protocol (TCP) optimization and header enrichment, caching, and load balancing. In addition, the network operator may configure service chains that each identify a set of the network services to be applied to packet flows mapped to the respective service chains. A service chain, in other words, defines one or more network services to be applied in a particular order to provide a composite service for application to packet flows bound to the service chain.

SUMMARY

In general, techniques are described in which a centralized controller constructs service chains that span multiple networks. Moreover, the centralized controller may allow for the construction of inter-network service chains without requiring direct reprogramming or reconfiguring provider edge routers that separate the networks. For example, the centralized controller may automatically synchronize between the networks any intra-network routing prefixes and next hop information that may be needed for constructing the service chains.

In one example implementation, the controller may, for example, automatically configures virtual private networks to establish a virtual network topology to direct traffic flows along a chain of service nodes (or "service chain") that provide network services to the traffic flows. For example, a controller that controls, in a centralized manner, routing within one or more networks may modify routes obtained from a destination network to direct traffic destined for prefixes associated with the obtained routes to a service node rather than to the destination network. The controller may then re-originate the modified routes into a routing instance for the destination network to cause a router that participates in the routing instance to import the modified, re-originated routes. The routing instance may correspond to a virtual routing and forwarding instance (VRF) or a network. In re-originating the modified routes into the routing instance for the destination network, the controller may set a route target for the modified routes that is a route target associated with the routing instance.

PE routers that have the routing instance ensure that any route associated with the route target is distributed to every PE router that has a routing instance associated with the route target. Accordingly, by setting a route target for the modified routes that is the route target of the routing instance, the controller may cause each PE router that has the routing instance to receive and install the modified routes to its routing instance, without the controller having to program each PE router with a route target associated with a routing instance for the destination network. In this way, the techniques may avoid reconfiguring the PE routers with a new route target, for the PE routers may import the re-originated, modified routes and direct network traffic to the service node in accordance with the modified routes.

In one example, a method comprises obtaining, by a controller and from a router in a first network, a route that specifies a next hop to an address prefix reachable by the first network; generating, by the controller, a modified route that specifies a service node as the next hop for the address prefix, wherein the service node is external to the first network; and sending, by the controller, the modified route to a second network, the modified route marked with an import route target configured for a provider edge router of the second network so that traffic from the first network and destined for the second network is forwarded to the service node.

In another example, a controller comprises one or more processors; a control unit configured to obtain, from a router in a first network, a route that specifies a next hop to an address prefix reachable by the first network; and a service chain unit configured to generate a modified route that specifies a service node as the next hop for the address prefix, wherein the service node is external to the first network, and wherein the control unit is further configured to send the modified route to a second network, the modified route marked with an import route target configured for a provider edge router of the second network so that traffic from the first network and destined for the second network is forwarded to the service node.

In another example, a non-transitory computer-readable medium contains instructions. The instructions cause one or more programmable processors to obtain, by a controller and from a router in a first network, a route that specifies a next hop to an address prefix reachable by the first network; generate, by the controller, a modified route that specifies a service node as the next hop for the address prefix, wherein the service node is external to the first network; and send, by the controller, the modified route to a second network, the modified route marked with an import route target configured for a provider edge router of the second network so that traffic from the first network and destined for the second network is forwarded to the service node.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
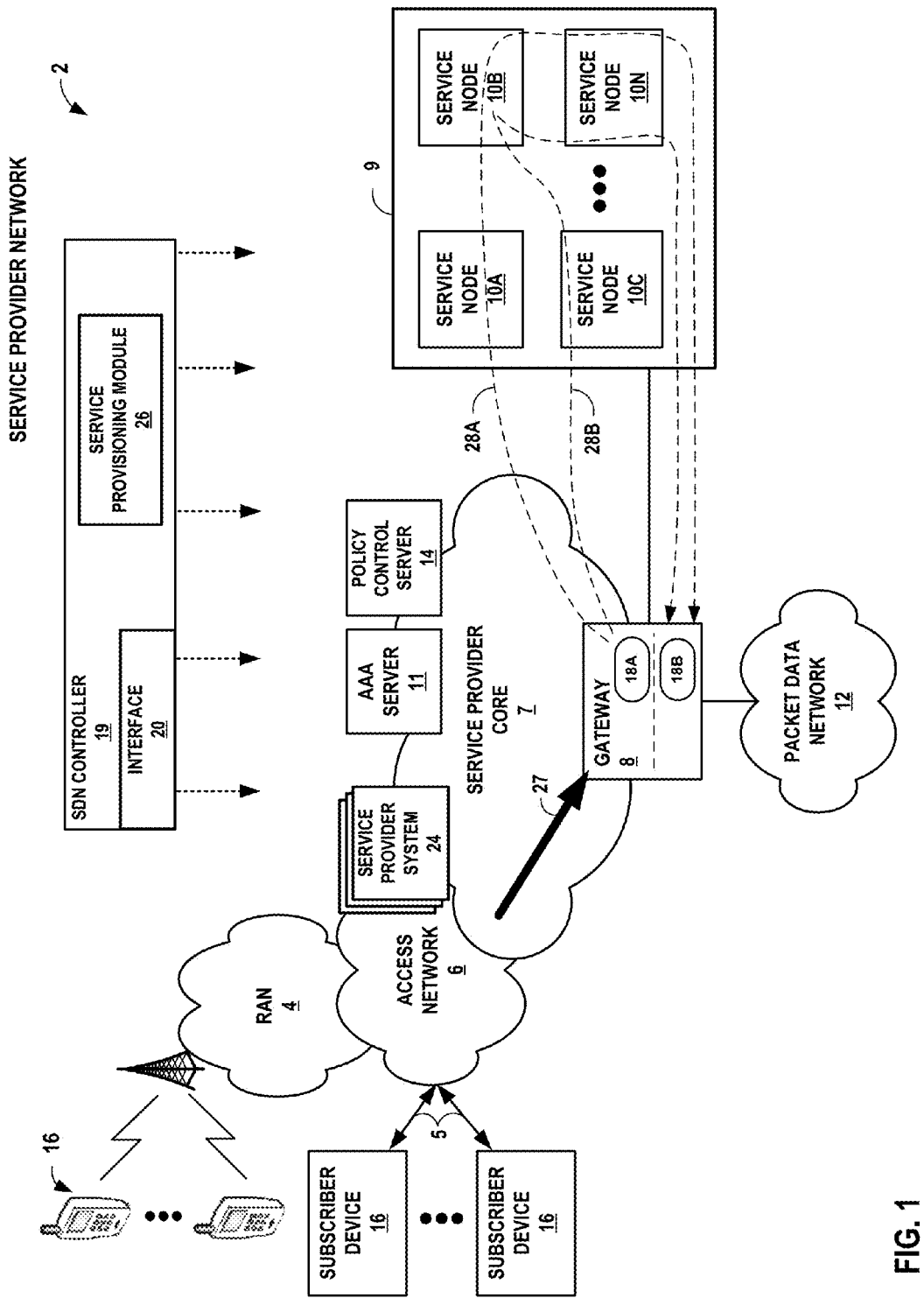
FIG. 1 is a block diagram illustrating an example network system in accordance with techniques described herein.

FIG. 1 illustrates an example network system in accordance with techniques described herein. The example network system of FIG. 1 includes a service provider network 2 that operates as a private network to provide packet-based network services to subscriber devices 16A-16N (collectively, "subscriber devices 16"). That is, service provider network 2 provides authentication and establishment of network access for subscriber devices 16 such that the subscriber device may begin exchanging data packets with PDN 12, which may represent an internal packet-based network of the service provider or an external packet-based network such as the Internet.

In the example of FIG. 1, service provider network 2 includes access network 6 ("access network 6") that provides connectivity to packet data network (PDN) 12 via service provider core network 7 and gateway 8. Service provider core network 7 and PDN 12 provide packet-based services that are available for request and use by subscriber devices 16. As examples, core network 7 and/or PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various embodiments, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Subscriber devices 16 connect to gateway 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing device associated with subscribers. In addition, subscriber devices 16 may comprise mobile devices that access the data services of service provider network 2 via radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like. Each of subscriber devices 16 may run a variety of software applications, such as word processing and other office support software, web browsing software, software to support voice calls, video games, videoconferencing, and email, among others. Subscriber devices 16 connect to access network 6 via access links that comprise wired and/or wireless communication links. The term "communication link," as used herein, comprises any form of transport medium, wired or wireless, and can include intermediate nodes such as network devices. Each of access links may comprise, for instance, aspects of an asymmetric DSL network, WiMAX, a T-1 line, an Integrated Service Digital Network (ISDN), wired Ethernet, or a cellular radio link.

A network service provider operates, or in some cases leases, elements of access network 6 to provide packet transport between subscriber devices 16 and gateway 8. Access network 6 represents a network that aggregates data traffic from one or more subscribers for transport to/from service provider core network 7 of the service provider. Access network 6 includes network nodes that execute communication protocols to transport control and user data to facilitate communication between subscriber devices 16 and gateway 8. Access network 6 may include a broadband access network, network, a wireless LAN, a public switched telephone network (PSTN), or other type of access network, and may include or otherwise provide connectivity for cellular access networks, such as radio access network (RAN) 4 of FIG. 1. Examples of access network 6 may also include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

Service provider core network 7 (hereinafter, "core network 7") offers packet-based connectivity to subscriber devices 16 attached to access network 6 for accessing PDN 12. Core network 7 may represent a public network that is owned and operated by a service provider to interconnect a plurality of networks, which may include access network 6. Core network 7 may implement Multi-Protocol Label Switching (MPLS) forwarding and in such instances may be referred to as an MPLS network or MPLS backbone. In some instances, core network 7 represents a plurality of interconnected autonomous systems, such as the Internet, that offers services from one or more service providers. PDN 12 may represent an edge network coupled to core network 7, e.g., by a customer edge device such as customer edge switch or router. PDN 12 may include a data center.

In examples of network 2 that include a wireline/broadband access network, gateway 8 may represent a Broadband Network Gateway (BNG), a Broadband Remote Access Server (BRAS), MPLS Provider Edge (PE) router, core router or gateway, or a Cable Modem Termination System (CMTS), for instance. In examples of network 2 that include a cellular access network as access network 6, gateway 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to gateway 8 may be implemented in a switch, service card or other network element or component.

A network service provider that administers at least parts of network 2 typically offers services to subscribers associated with devices, e.g., subscriber devices 16, which access the service provider network. Services offered may include, for example, traditional Internet access, Voice-over-Internet Protocol (VoIP), video and multimedia services, and security services. As described above with respect to access network 6, core network 7 may support multiple types of access network infrastructures that connect to service provider network access gateways to provide access to the offered services. In some instances, network system may include subscriber devices 16 that attach to multiple different access networks 6 having varying architectures.

In general, any one or more of subscriber devices 16 may request authorization and data services by sending a session request to gateway 8. In turn, gateway 8 typically accesses Authentication, Authorization and Accounting (AAA) server 11 to authenticate the subscriber device requesting network access. Once authenticated, any of subscriber devices 16 may send subscriber data traffic toward service provider core network 7 in order to access and receive services provided by PDN 12, and such packets traverse gateway 8 as part of at least one packet flow. Flows 27 illustrated in FIG. 1 represent one or more upstream packet flows from any one or more subscriber devices 16 and directed to PDN 12 via gateway 8, which is a next hop for PDN 12 for traffic from subscribers. Gateway 8 includes a routing instance 18A routing and forwarding for traffic on its core-facing interfaces. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device may originate multiple packet flows upon authenticating to service provider network 2 and establishing a communication session for receiving data services.

As described herein, service provider network 2 includes a services complex 9 having a cluster of service nodes 10A-10N that provide an execution environment for the network services. That is, each of service nodes 10 apply one or more services. As examples, service nodes 10 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of service nodes 10 in this way represents a service instance.

Gateway 8 may represent a gateway node for the services complex 9 that is a physical gateway router or switch that connects virtual networks of the services complex to physical networks such as the Internet, a customer VPN (e.g., L3VPN), another data center, or to non-virtualized servers. In such examples, services complex 9 may include layer two (L2) and layer three (L3) switching and routing components that provide point-to-point connectivity between servers (not shown) that execute one or more of service nodes 10 within a virtual environment. That is, one or more of service nodes 10 may run as virtual machines in a virtual compute environment. Moreover, the compute environment may comprise a scalable cluster of general computing devices, such as x86 processor-based servers. As another example, service nodes 10 may comprise a combination of general purpose computing devices and special purpose appliances.

As virtualized, individual network services provided by service nodes 10 can scale just as in a modern data center, through the allocation of virtualized memory, processor utilization, storage and network policies, as well as horizontally by adding additional load-balanced virtual machines. In one example, services complex 9 comprises a set of interconnected, high-performance yet off-the-shelf packet-based routers and switches that implement industry standard protocols. In one example, services complex 9 may comprise off-the-shelf components that provide Internet Protocol (IP) over an Ethernet (IPoE) point-to-point connectivity.

Again in such examples, SDN controller 19 provides a high-level controller for configuring and managing routing and switching infrastructure of services complex 9. SDN controller 19 provides a logically and in some cases physically centralized controller for facilitating operation of one or more virtual networks within services complex. Additional information regarding a SDN controller 19 operating as a virtual network controller in conjunction with other devices of services complex 9 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

As shown in FIG. 1, gateway 8 steers individual subscriber packet flows 27 through defined sets of services provided by service nodes 10. That is, each subscriber packet flow may be forwarded through a particular ordered combination of services provided by service nodes 10, each ordered set being referred to herein as a "service chain." In the example of FIG. 1, one or more subscriber packet flows 27 are directed along a first service chain 28A and, therefore, receive services applied by service nodes 10A, 10B and 10N, in that order. Similarly, one or more subscriber packet flows 27 are directed along a second service chain 28B and, therefore, receive services applied by service nodes 10C, 10B and 10N.

In this way, subscriber flows 27 may be processed by service nodes 10 as the packets flow between access network 6 and PDN 12 according to service chains configured by the service provider. In the illustrated example, service chain 28A identifies the ordered set of nodes 10A, 10B, and 10N according to the listed ordering. Service chain 28B identifies the ordered set of nodes 10C, 10B and 10N. Accordingly, packet flows 27 processed according to service chain 28A follow a service path that traverses nodes 10A, 10B, and finally node 10N as the terminal node for the service chain 28A. A particular node 10 may support multiple service chains. In this example, service node 10B supports service chains 28A, 28B.

Once processed at a terminal node of the service chain, i.e., the last node 10 to apply services to packets flowing along a particular service path, the terminal node may direct the traffic back to gateway 8 for further processing and/or forwarding to PDN 12 according to routing instance 18B that includes routes for PDN 12. For example, traffic engineered service paths may start and terminate with gateway 8. In some cases, separate network devices (logical or physical) may start and terminate any of service chains 28.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. The arrows denoted as service chains 28A, 28B illustrate respective paths taken by packet flows mapped to the service chains 28A or 28B. For example, a given subscriber may be associated with a particular service profile, which in turn is mapped to a service tunnel associated with service chain 28A. Similarly, another subscriber may be associated with a different service profile, which in turn is mapped to a service tunnel associated with service chain 28B. Gateway 8, in some instances after authenticating and establishing access sessions for the subscribers, may direct packet flows for the subscribers along the appropriate service tunnels, thereby causing service complex 9 to apply the requisite ordered services for the given subscriber.

Service nodes 10 may implement service chains 28A, 28B using internally configured forwarding state that directs packets of the packet flow along the service chains 28A, 28B for processing according to the identified set of service nodes 10. Such forwarding state may specify tunnel interfaces for tunneling between service nodes 10 using network tunnels such as Internet Protocol (IP) or Generic Route Encapsulation (GRE) tunnels, or by using Virtual Local Area Networks (VLANs), Multiprotocol Label Switching (MPLS) techniques, and so forth. In some instances, real or virtual switches, routers or other network elements that interconnect connect service nodes 10 may be configured to direct packet flow to the service nodes 10 according to service chains 28A, 28B. One or more tunnel endpoints for a given service chain 28 may each be associated with a different virtual private network overlaying a physical underlay network. Such a tunnel endpoint may be logically located and implemented by a network element that has a routing instance (e.g. a VRF) for the virtual private network for the tunnel endpoint. Such a network element, whether physical or virtual, may be considered and alternatively referred to as a provider edge (PE) router for the virtual private network for the tunnel endpoint. A network element may be a PE router for multiple virtual private networks.

In FIG. 1, software-defined networking (SDN) controller 19 provides a high-level controller for configuring and managing routing and switching infrastructure of service provider network 2 (e.g., gateway 8, core network 7 and service nodes 10). In some instances, SDN controller 19 manages deployment of virtual machines within the operating environment of value-added services complex 9. SDN controller 19 communicates with gateway 8 to specify service chain 28A, 28B information. Service chain information provided by SDN controller 19 may specify any combination and ordering of value-added services provided by service nodes 10, traffic engineering information (e.g., labels or next hops) for tunneling or otherwise transporting (e.g., MPLS or IP tunnels) packet flows along service paths, rate limits, Type Of Service (TOS) markings or packet classifiers that specify criteria for matching packet flows to a particular service chain 28A, 28B. Further example details of an SDN controller for a software-defined network are described in PCT International Patent Application PCT/US13/44378, filed Jun. 5, 2013, the entire contents of which are incorporated herein by reference.

Service provider network 2 may include an Authentication, Authorization and Accounting server 11 ("AAA server 11"). For example, upon detecting a new traffic flow, gateway 8 may authenticate new subscribers to AAA server 11, e.g., by way of the Radius or Diameter protocols, and, at this time, receive a service profile or other information that defines the services to be applied to the subscriber or maps the various traffic expected for the subscriber to one or more service flows. Upon detecting a new flow, the gateway 8 selects the service chain for the flow based on the service profile and traffic type. For example, gateway 8 selects one of the service chains for the packet based on the service profile received for the subscriber and/or based on the type of traffic, e.g., HTTP traffic or VoIP traffic.

Service nodes 10 may receive subscriber-specific service requirements from other elements of service provider network, such as SDN controller 19, AAA server 11, policy control server 14 or other subscriber control systems to configure the services chains. For example, when processing packet flows, service nodes 10 may issue receive subscriber-specific service requirements. Examples of subscriber-specific service requirements returned by SDN controller 19 or AAA server 11 include policies, service level agreement parameters, information describing the services to be applied for a particular subscriber, and the like.

As a specific example, one or more of service nodes 10 may implement policy and charging control (PCC) functionality for subscriber devices 16. In response to queries issued by any of service nodes 10, policy control server 14 issues responses to provision the requesting service node by a policy interface with one or more policy rules that each specifies a set of information enabling the detection of a service data flow and defining policy control, charging, or application detection parameters for application by network elements of access network 6. Policy control server 14 may provision one or more service nodes 10 with a Policy Control and Charging Rules Function (PCRF) for a mobile (e.g., 3GPP) subscriber devices or, alternatively or in addition, for a broadband/wireline subscriber devices.

One or more of service nodes 10 may, for example, provide an operating environment for a policy enforcement module that enforces subscriber-based policy and charging control according to the policy rules. In some examples, the policy interface presented by a service node 10 may represent a Gx and/or Sd interface/reference point provided by one or more service nodes. In some instances, the policy rules provided by policy control server 14 to gateway 8 include PCC rules and the policy enforcement module(s) executing on service nodes 10 represents a Policy and Charging Enforcement Function (PCEF). In some instances, the policy rules may also or alternatively include Application Detection and Control (ADC) rules and the policy enforcement module implemented by one or more service nodes may represents a Traffic Detection Function (TDF). In some instances, the policy enforcement module(s) of service nodes 10 may represent a Policy Decision Point for a BPCF framework. Further details regarding policy and charging controls are found in "3GPP TS 23.203—Policy and Charging Control Architecture (Release 10)," Version 10.1.0, 3rd Generation Partnership Project, Technical Specification Group Services and System Aspects, September 2010; and 3GPP TS 29.212—Policy and Charging Control (PCC), Reference Points (Release 11)," Version 11.7.0, February 2012; which are each incorporated herein by reference in their entirety.

In accordance with techniques of the disclosure, service provider network 2 may include a service provider system 24. In general, service provider system 24 may send requests to SDN controller 19 that cause SDN controller 19 to validate, provision, and/or manage services provided by service provider network 2. Service provider system 24 may send data-interchange formatted messages to interface 20 of SDN controller 19 that include requests to validate, provision, and/or manage services provided by service provider network 2. In some examples, service provider system 24 is implemented and operated by the service provider that manages service provider network 2. In such examples, customers of the service provider may interact with service provider system 24 using a client device (not shown). For instance, service provider system 24 may provide a portal that includes a graphical user interface and/or application programming interface (API), which allow customers to submit requests for network services. Examples of customers may include universities, businesses, or any other entities that purchased or otherwise use services provided by service provider network 2. In other examples, service provider system 24 may be owned, operated, and/or maintained by the customer rather than the service provider that manages service provider network 2.

Service provider system 24 may send data-interchange formatted messages to interface 20 of SDN controller 19 to request network services. In some examples, interface 20 is implemented according to a stateless, client-server communications architecture. The stateless, client-server communications architecture may rely on a protocol that is cacheable. As an example, interface 20 may be implemented according to a representational state transfer (REST) software architecture to send and receive data-interchange formatted messages with service provider system 24. Data-interchange formatted messages may conform to an open standards format that uses human-readable text to transmit data objects that include attribute-value pairs. An example of a data-interchange formatted message format is JavaScript Object Notation (JSON), described in RFC 7159 and ECMA-404.

To submit requests to SDN controller 19, service provider system 24 may generate data-interface formatted messages that include service abstractions. A service abstraction may include a definition of one or more services and/or resources of a network requested by a customer. As one example, a service abstraction may specify a Virtual Private Network (VPN) service requested by a customer between one or more customer sites. Service provider system 24 may structure the service abstraction in a data-interface formatted message according to one or more schemas that define the requirements for the structure, content, and/or semantics of the data-interface formatted message. In some examples, SDN controller 19 may store and provide the schemes for interface 20, which may be retrieved by service provider system 24. In other examples, service provider system 24 may receive the schemas from sources other than SDN controller 19.

An example of a service abstraction specified in a data-interface formatted message may include the following:

```
{
    "service_name" : "citi_l3vpn",
    "service_type" : "l3vpn",
    "customer" : "citi",
    "sites" : [
        "SFO",
        "LAX",
        "NYC",
        "DFW"
    ],
    "topology" : "full-mesh",
    "qos_profile" : "gold"
}
```

The attributes "service—name", "service—type", "customer", "sites", "topology" and "qos_profile" attributes together with the corresponding values collectively define a request to configure a full mesh VPN with a Gold quality of service profile between customer sites SFO, LAX, NYC, and DFW. The above service abstraction conforms to a schema described at the end of this disclosure.

In response to input provided by a customer to request a service, service provider system 24 may generate a data-interface formatted message that includes a service abstraction defining the service, such as described for the VPN service above. Service provider system 24 sends the data-interface formatted message to interface 20. Service provisioning module 26 may realize the state of the network represented by the data-interface formatted message. That is, service provisioning module 26 may translate the high-level data model of the service abstraction defining the service into a lower level form suitable for interacting with network elements including, e.g. service node 10 and service provider core 7. SDN controller 19 may validate the request included in the message and provision the service if sufficient resources exist to satisfy the request. In this way, interface 20 and service provisioning module 26 may provide a flexible service abstraction layer on top of SDN controller 19 that can support fast-changing service types, adapt to real time network resources, and enforce business logic.

Service provider system 24 may be implemented as hardware, software, and/or a combination of hardware and software. Although shown as a standalone system in FIG. 1, any set of functionality of service provider system 24 described in this disclosure may be implemented in SDN controller 19, gateway 8, AAA server 11, policy control server 14, or any other suitable device.

As described above, service nodes 10 may implement service chains 28A, 28B using internally configured forwarding state that directs packets of the packet flow along the service chains 28A, 28B for processing according to the identified set of service nodes 10. Such forwarding state may specify tunnel interfaces for tunneling between service nodes 10 using network tunnels such as Internet Protocol (IP), Multiprotocol Label Switching (MPLS) label switched paths (LSPs), Generic Route Encapsulation (GRE) tunnels, or by using Virtual Local Area Networks (VLANs), VxLANs, techniques, and so forth. An MPLS or VxLAN label may identify, to a virtual router executing on a tunnel endpoint, a routing instance for tunneled packets with which to forward the tunneled packets to the appropriate one of service nodes 10. Additional information regarding virtual routing and forwarding is found in U.S. Provisional Patent Appln. No. 61/973,045, filed Mar. 31, 2014 and entitled HIGH-PERFORMANCE, SCALABLE AND DROP-FREE DATA CENTER SWITCH FABRIC, the entire contents of which being incorporated by reference in its entirety. In some instances, real or virtual switches, routers, or other network elements that interconnect service nodes 10 may be configured to direct packet flow to the service nodes 10 according to service chains 28A, 28B.

In accordance with techniques described herein, SDN controller 19 provisions other components of service provider network 2 with forwarding information to direct the components to forward traffic along service chains 28A, 28B. For service chain 28A, for example, SDN controller 19 may provision respective routing instances that include virtual interfaces for service nodes 10A, 10B, and 10N and at least one routing instance of gateway 8 in order to steer traffic along service chain 28A from gateway 8, to service node 10A, to service node 10B, to service node 10N, and thence again to gateway 8. More specifically, SDN controller 19 may communicate with virtual routers and gateway 8 to (1) manipulate route targets and provision service node 10 servers and/or advertise routes within the virtual and/or physical networks, and/or (2) manipulate next-hops and/or labels of the routes from routing instance to routing instance to steer traffic through the right sequence of routing instances and, accordingly, the right sequence of virtual interfaces for service nodes 10 in order to realize service chain 28A.

In some examples, SDN controller 19 automatically configures virtual private networks to establish a virtual network topology to direct traffic flows along service chain 28A includes service nodes 10 that provides services to the traffic flows. For example, SDN controller 19 may modify routes obtained from a destination network for the network traffic to direct traffic destined for prefixes associated with the obtained routes along service chain 28A rather than directly to the destination network. The SDN controller 19 may then re-originate the modified routes into a routing instance to cause a physical or virtual router that participates in (or "has") the routing instance to import the modified, re-originated routes. The routing instance may correspond to a virtual routing and forwarding instance (VRF). In re-originating the modified routes into the routing instance, the SDN controller 19 may set a route target for the modified routes that is a route target associated with the routing instance.

Provider edge (PE) routers, such as gateway 8 or a network element that implements any of service nodes 10, that have the routing instance ensure that any route associated with the route target is distributed to every PE router that has a routing instance associated with the route target. Accordingly, by setting a route target for the modified routes that is the route target of the routing instance, the SDN controller 19 may cause each PE router that has the routing instance to receive and install the modified routes to its routing instance, without the SDN controller 19 having to program each PE router with a route target associated with a routing instance for the destination network. In this way, the techniques may avoid reconfiguring the PE routers with a new route target, for the PE routers may import the re-originated, modified routes and direct network traffic along service chains 28 in accordance with the modified routes.

Figure 2:
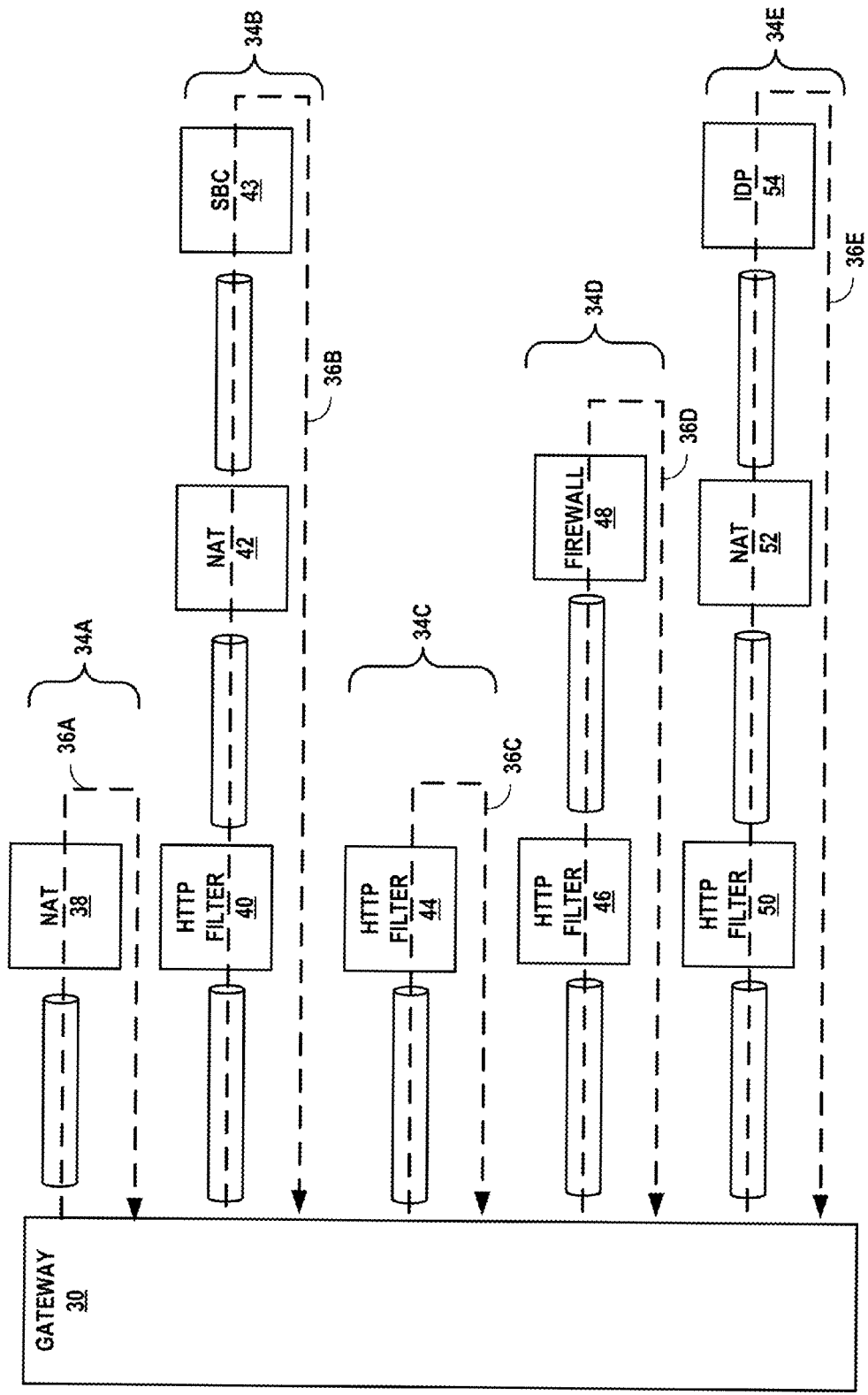
FIG. 2 is a block diagram illustrating an example network system in accordance with techniques described herein.

FIG. 2 is a block diagram illustrating an example set of service chains supported by an example controller. In particular, FIG. 2 illustrates a set of service chains 34A-34E supported by gateway 30. Gateway 30 may, in one example, represent gateway 8 of FIG. 1 such that service chains 34 represent an example set of service chains 28 provided by service nodes 10.

In this example, one or more subscriber packet flows 36A are directed along a first service chain 34A to receive network address translation (NAT) service 38. Similarly, one or more subscriber packet flows 36B are directed along a second service chain 34B for application of an HTTP filter service 40, NAT service 42 and session border controller (SBC) services 43 for voice over IP (VoIP) processing and control. In service chain 34C, packet flows 36C are directed only to HTTP filter service 44. In service chain 34D, packet flows 36D are directed to HTTP filter 46 and subsequently to firewall service 48. As another example, packet flows 36E are directed along service chain 34E for application of HTTP filter 50, NAT 52 and intrusion detection and prevention (e.g., deep packet inspection) service 54. Each of NAT services 38, 42, and 52; HTTP filter services 40, 44, 46, and 50; SBC services 43; firewall service 48, and IDP 54 may represent examples of any of service nodes 10.

Figure 3:
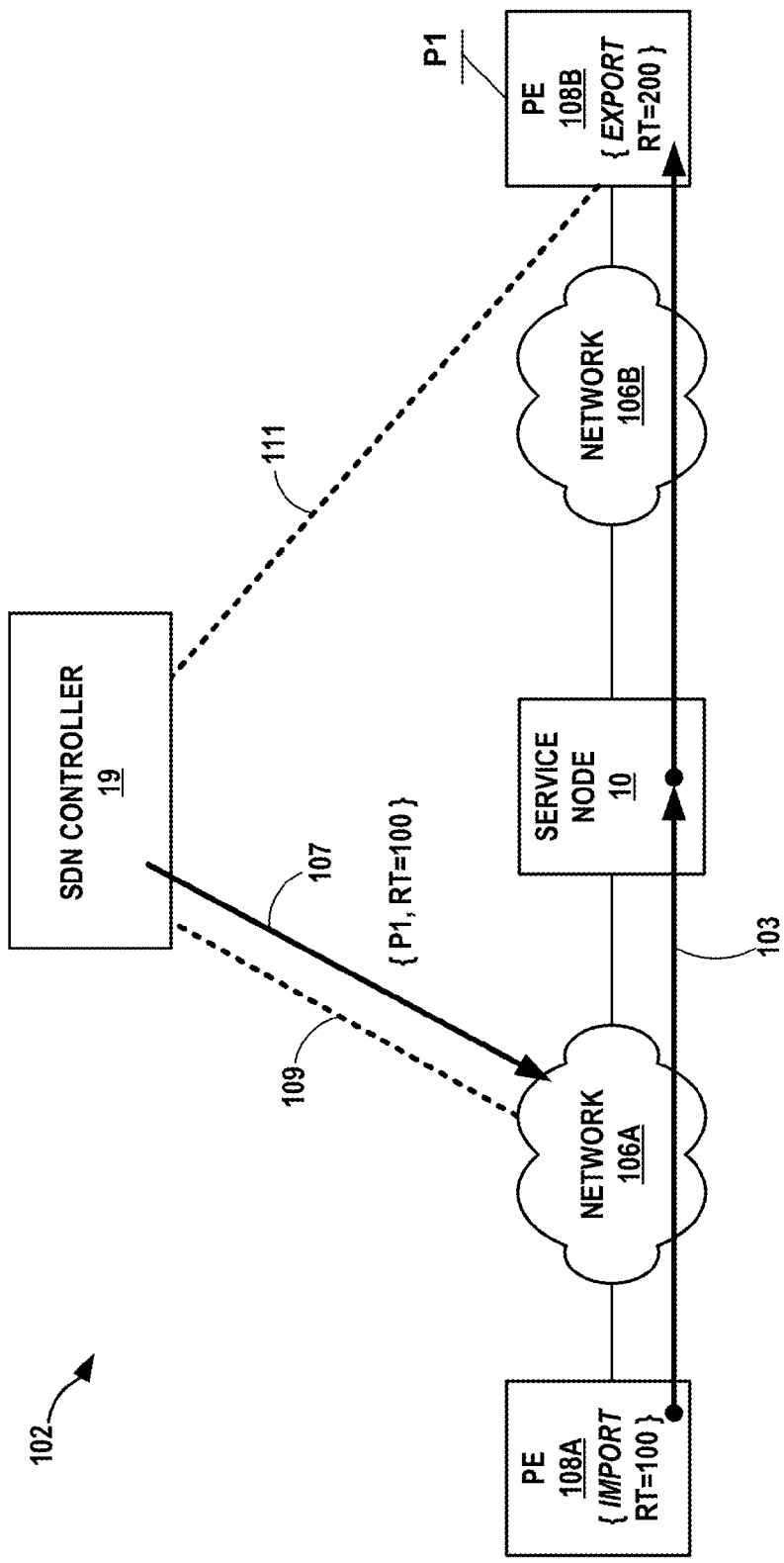
FIG. 3 is a block diagram illustrating an example network system in accordance with techniques described in this disclosure.

FIG. 3 is a block diagram illustrating an example network system in accordance with techniques described in this disclosure. Network system 102 includes networks 106A-106B (collectively, "networks 106") having respective provider edge (PE) routers 108A-108B (collectively, "PE routers 108"), SDN controller 19, and service node 10. Network system 102 may represent at least a portion of an example aspect of service provider network 2 of FIG. 1, such as gateway 8 in combination with a data center edge represented by service complex 9.

The provider edge (PE) routers 108 extend attachment circuits to customer edge (CE) devices to provide services to customers. In some cases, the network system 102 implements BGP/Multiprotocol Label Switching (BGP/MPLS) Internet Protocol (IP) Virtual Private Networks (VPNs) to segregate traffic for different customers by ensuring that routes from different VPNs remain distinct and separate, regardless of whether VPNs for respective customers have overlapping address spaces. For each VPN configured for the network system 2 and in which a particular PE router 108 participates, the PE router maintains a VPN Routing and Forwarding instance (VRF). In general, each attachment circuit connecting a PE router and a CE device is associated with a VRF. For any given VPN, the PE router 108 learns routes for the VPN, in some cases from the CE device, and installs the VPN routes to the corresponding VRF, which the PE router 108 uses to forward traffic. In addition, the PE router 108 distributes learned VPN routes to other PE routers 108 (or to PE routers of other networks) using BGP. BGP/MPLS IP VPNs are described in detail in Rosen & Rekhter, "BGP/MPLS IP Virtual Private Networks (VPNs)," Internet Engineering Task Force Network Working Group, Request for Comments 4364, February, 2006, which is incorporated herein by reference in its entirety (hereinafter "RFC 4364").

In instances that use BGP/MPLS IP VPNs, PE routers 108 use Route Target (RT) extended communities ("route targets") to control the distribution of routes into VRFs. For a given collection of PE routers that peer using BGP, each PE router only stores VPN routes that are received and marked with route targets corresponding to VRFs that have local CE attachment circuits configured for the PE router. The PE router may discard all other VPN routes that it receives.

PE routers 108 may execute one or more interior gateway protocols, such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP). PE routers 108 are logically located at the "edge" of respective networks 106 and may extend attachment circuits to customer edge (CE) device(s) or customer device(s) to provide services to one or more customers. Either or both of networks 106 may represent physical or virtual networks (e.g., VPNs) established for network system 102, and thus either or both of PE routers 108 may represent virtual PEs executing on one or more real servers. Any of PE routers 108 may alternatively represent an "external" PE router, such as a data center gateway to network system 102 (e.g., gateway 8 of FIG. 1), with which controller 19 may peer according to a routing protocol (e.g., BGP) but that is not configurable with routes by SDN controller 19. That is, in some examples, whereas other PE routers of network 106A may be virtual routers configurable by the SDN controller 19, PE router 108A may be a physical router that is not configurable by the SDN controller 19 but is able to exchange network packets with network 106A, for instance. As one example, the SDN controller 19 may in some instances be unable to configure a route target for a Virtual Routing and Forwarding instance (VRF) for PE router 108A because PE router 108A is a physical router that does not expose a configuration interface to the SDN controller 19. VRFs are described in further detail below.

CE devices (not shown in FIG. 3) may each represent a network device, located at a customer site, that connects to either of networks 106 to receive services. Although referred to herein as devices, CE and customer devices (also not shown in FIG. 3) may represent either physical or virtual machines (VMs), routers, switches, appliances, and controllers, for example. Furthermore, customer devices such as application VMs may be considered CE devices from the perspective of the VPN despite not implementing conventional edge functionality, such as speaking one or more routing protocols.

Components of network system 102 implement Virtual Private Networks (VPNs) to segregate traffic by ensuring that routes from different VPNs remain distinct and separate, regardless of whether the multiple VPNs have overlapping address spaces. In some cases, the VPNs represent Internet Protocol VPNs (IP VPNs) such as BGP/Multiprotocol Label Switching (BGP/MPLS) IP VPNs. For each VPN configured for the network system 102 and in which a particular PE router of PE routers 108 participates, the PE router may implement a VPN Routing and Forwarding instance (VRF). A PE router that implements a VRF of the network system 102 may have a distinct routing table for the VRF by which the PE router forwards network packets associated with the VRF. Because this distinct routing table for the VRF and the VRF itself are often referred to interchangeably, in this respect, the PE router may also be referred to as "having" a VRF. Every attachment circuit connecting one of PE routers 108 and a CE/customer device may also be associated with a VRF.

For any given VPN, a PE router 108 learns routes for the VPN from CE devices connected to the PE router 108 via an attachment circuit for the VPN as well as from routing advertisements within its respective network 106 that are marked with a route target corresponding to a VRF that has an attachment circuit configured for the PE router. One or more VRFs of the PE routers 108 may be configured with a route target to direct the PE router to import all routes received that are marked with the route target into the VRFs. In addition, the PE routers 108 may distribute learned VPN routes to other PE routers 108 of service provider network 4 using a routing protocol such as BGP. BGP/MPLS IP VPNs are described in detail in RFC 4364, incorporated above. In the illustrated example, PE router 108A is configured to import routes marked with a route target of 100, and PE router 108B is configured to export routes marked with a route target of 200. Each of networks 106 may be associated with a different VRF. The VRF for network 106A is associated with the route target of 100 and the VRF for network 106B is associated with the route target of 200.

Within a single VPN, pairs of PE routers 108 may connect by a bidirectional tunnel (not shown for ease of illustration), which may include at least one MPLS label switched path (LSP), Generic Route Encapsulation tunnel, VxLAN, or other suitable tunneling connection between pairs of PE routers 108 that is capable of tunneling IP traffic between the PE routers. PE routers 108 may establish tunnels using, e.g., Resource Reservation Protocol (RSVP) or Label Distribution Protocol (LDP).

Network system 102 may additionally include one or more core (P) routers (not shown for ease of illustration) that implement, at least in part, tunnels between pairs of PE routers 8 for IP VPNs. P routers may support MPLS LSP or label distribution protocol (LDP) functionality, for instance, but the P routers do not necessarily need to support VPN functionality. Network system 102 may include a data switch fabric underlay for networks 106 overlaid thereon.

Service node 10 represents a physical or virtual node that applies a service to network traffic received by the service node 10. Service node 10 may, for instance, apply network services such as firewall, DPI, IDS, IPS, carrier grade network address translation (CG-NAT), performance enhancement proxies for video, transport control protocol (TCP) optimization and header enrichment, caching, and load balancing to the network traffic.

Service node 10 may represent an appliance (e.g., firewall appliance, VPN appliance, and so forth), server, components or modules of a single appliance or server, virtual machines executed a server, or any combination of the above. Service node 10 may be a device managed as part of a value-added services complex, which may represent a data center. Service node 10 may also, in some instances, be coupled by one or more switches or virtual switches of a core network, may in some instances be inline for packet flows from a gateway of any of networks 106, or any combination of the above. Service node 10 may represent a virtual machine orchestrated by the SDN controller 19 that implements, in accordance with techniques described herein, service chains by sequentially directing packets to the service node 10 according to an orderings specified by one or more service chains, including service chain. Service node 10 may be associated with an IP address by which the service node is addressable to direct network traffic. Service node 10 may in some examples alternatively be referred to as a "service point," "value-added service (VAS) point" or node, or "network function virtualization (NFV) node." Network function virtualization involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines instead of on physical hardware appliances. Network function virtualization in the service provider network may provide Value Added Services (VAS) for edge networks such as business edge networks, broadband subscriber management edge networks, and mobile edge networks. Access network 6 of FIG. 1 is an example of an edge network for service provider network 2 of FIG. 1.

The arrows denoted as service path 103 illustrate a path taken by packet flows mapped to a corresponding service chain for service path 103. The controller 19 may compute and establish service path 103.

The controller 19 manages (at least in part) VPNs of network system 102 to direct traffic along service path 103 to service node 10 and thereafter to PE router 108B. The traffic may be destined for address prefixes originated by PE router 108B as well as sourced by address prefixes originated by PE router 108A. The SDN controller 19 may represent one or more servers, appliances, dedicated controller devices, or any combination of the above that executes processes to manage VPNs of network system 102. In the illustrated example, The SDN controller 19 establishes routing protocol sessions 109 with devices of network 106A to exchange routing protocol communications that advertise routes to destination address prefixes. The routing protocol advertisements may include an MPLS label identifying a VPN, a destination address prefix, route target, and a next hop router for the traffic destined to an address within the destination address prefix. The routing protocol advertisements may also include a route distinguisher. Routing protocol session 109 may represent one or more BGP peering sessions with one or more PE routers of networks 106A, and the routing protocol advertisements for protocol sessions in this case may be BGP UPDATE messages extended to include Multiprotocol Reachable NLRI (MP-REACH NLRI). Multiprotocol Reachable NLRI is described in further detail in Bates et al., "Multiprotocol Extensions for BGP-4," Internet Engineering Task Force Network Working Group, Request for Comments 2858, June, 2000, which is incorporated herein by reference in its entirety (hereinafter, "RFC 2858").

The SDN controller 19 further exchanges communication via communication session 111 with at least one device of network 106B. Communication session 111 may represent an Extensible Messaging and Presence Protocol (XMPP) session or a session for another communication protocol suitable for exchanging control state. Although described as a "session," communication session may not necessarily be stateful. Via communication session 111, PE 108B may exchange control state with SDN controller 19. For example, PE 108B may provide routes reachable by network 106B including a route for prefix P1. The route may include one or more of the prefix P1, a virtual network identifier for network 106B, and a physical network address for a network element that executes PE router 108B (e.g., a real server).

In accordance with techniques described herein, the SDN controller 19 receives, via communication session 111, at least one route for network 106B for an address prefix P1 for which PE router 108B is the next hop router. To establish service path 103 to direct traffic originated in network 106A and destined to prefix P1 to service node 10 for processing, controller 19 modifies the next hop for P1 received in a routing protocol advertisement from network 106B to refer to an interface of service node 10. In some examples, modifying the next hop in the routing protocol advertisement for P1 may include modifying a destination network address for an underlying physical network to point to a network address of a server that executes service node 10 or to a network address of a service device such as a firewall or load balancing device. In some examples, modifying the next hop in the routing protocol advertisement for P1 may also, or alternatively, include modifying a label or other virtual network identifier, tunnel encapsulation information, or other next hop information that identifies service node 10 to a combination of network 106A and (in some cases) an underlying physical network.

For example, SDN controller 19 may generate, or obtain from PE 108B via communication session 111, a route that specifies PE router 108B as the next hop. The route may also include a virtual network identifier that, when located in a tunnel encapsulation header for encapsulated data traffic, is associated with a routing instance for network 106B. The SDN controller 19 may modify the next hop to instead specify service node 10 as the next hop address. The modified next hop address may correspond to an interface for a real server to the underlying physical network, or an interface for a service appliance/controller, for instance. In addition, in some instances, the SDN controller 19 may modify the next hop to include a virtual network identifier that identifies a routing instance for service node 10. In addition, in some instances, the SDN controller 19 may modify the route distinguisher. As a result, in instances in which service node 10 is applied by a virtual machine executing on a server that has one or more routing instances, the virtual router for the service may direct service path 103 traffic that includes the virtual network identifier to service node 10, which is associated in the virtual router with the routing instance, as described in further detail below.

SDN controller 19 then advertises P1 as a route in a routing protocol message 107 to network 106A, the route modified as described above to have a next hop set to the service node 10 "left" interface and marked with a route target of 100. This advertisement by the SDN controller 19 into network 106A may be alternatively referred to as "re-origination" to distinguish the original origination that may have been performed by router 108B. As a result, PE router 108A (and other PE routers of network 106A configured to import route target 100) imports the route with the prefix P1 and the next hop set to the service node 10 interface and to its VRF for network 106A. Having imported the route advertised in routing protocol message 107, PE router 108A forwards network traffic destined for P1 to the route next hop, i.e., service node 10. In some examples, the route in routing protocol message 107 may include a label that identifies service node 10 executed as a virtual machine by a server that has an interface addressable by the next hop specified by the route. The label may be a label that identifies a VRF implemented by the server for service node 10. This VRF may be alternatively referred to as a "service VRF" or "service routing instance" and may be particular to the service node 10, e.g., established by SDN controller 19 or another entity for the purpose of directing traffic to service node 10.

SDN controller 19, without having to configure PE router 108A with a new route target to import the routes associated with the VRF for network 106B, is in this way nevertheless able to watch/obtain prefixes for network 106B and to direct network traffic destined for network 106B prefixes along service path 103. The techniques described above may be particularly applicable in topologies of network system 2 in which PE router 108A is a physical, external or gateway router over which SDN controller 19 has little or no configuration capability, such as the capability to configure an import route target for a VPN. That is, SDN controller 19 may use techniques described herein to cause PE router 108A to import routes for other networks despite the SDN controller 19 being unable, in some examples, to configure the PE router 108A with import route targets.

Figure 4:
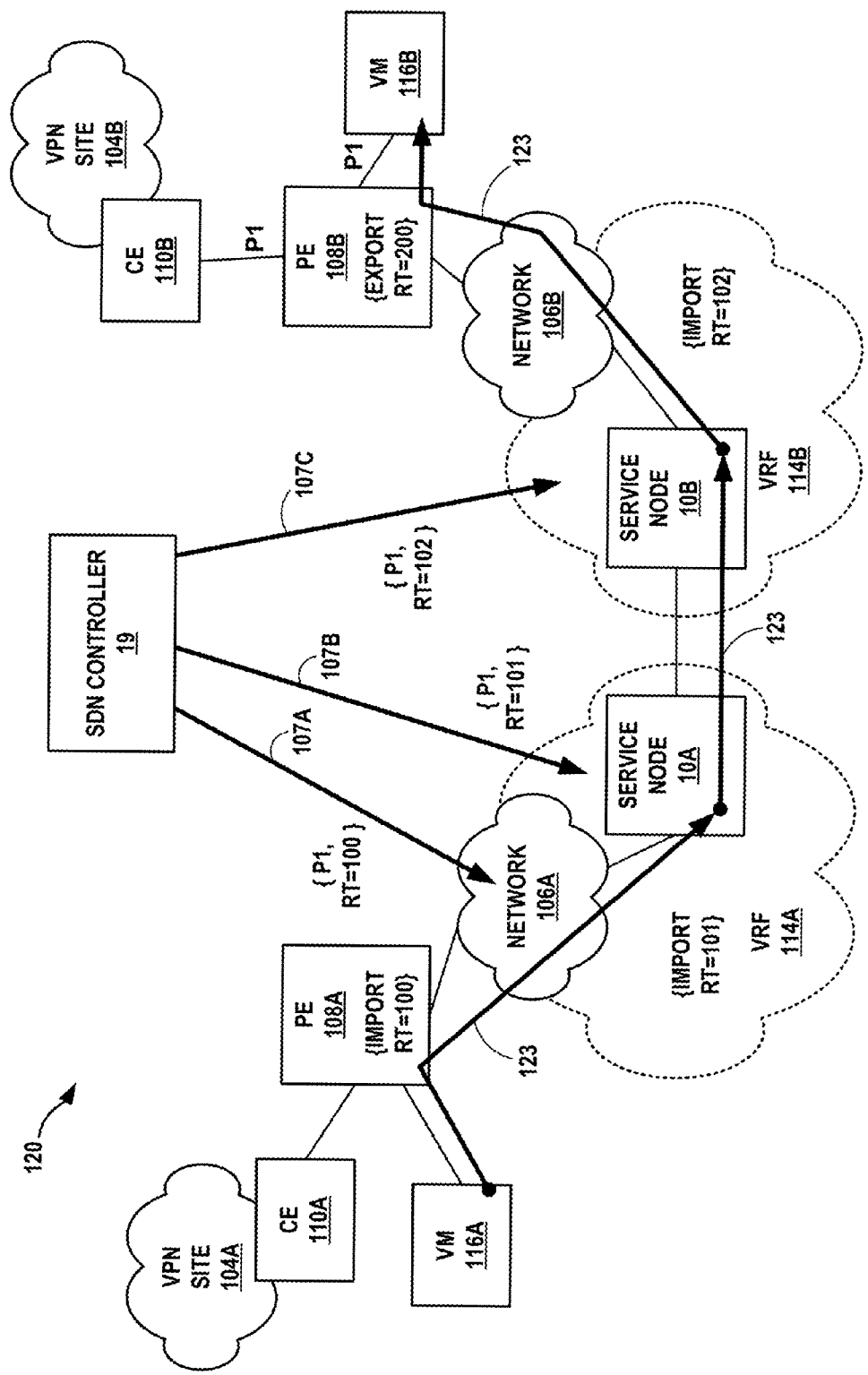
FIG. 4 is a block diagram illustrating an example network system in accordance with techniques described in this disclosure.

FIG. 4 is a block diagram illustrating an example network system in accordance with techniques described in this disclosure. Any routing protocol or other communication sessions between SDN controller 19 and PE routers (including, e.g., virtual routers) of the network system 120 are not shown for ease of illustration purposes. The example network system 120 includes a service path 123 that has two service nodes 10A-10B, which may represent any of the example service nodes 10 of FIGS. 1-3. SDN controller 19 performs techniques similar to those described above with respect to re-originate, in network 106A, a route that specifies an address prefix for at least one of VM 116A and VPN site 104B and a next hop set to an interface of service node 10A. In some examples, the route further specifies a label that identifies the service node 10A to a PE router that has VRF 114A, e.g., by identifying the VRF 114 itself which is associated with forwarding information to steer the traffic to the service virtual machine that executes service node 10A on the next hop server that hosts the service virtual machine. SDN controller 19 may allocate the label for the VRF 114A to allow a virtual router executing on the next hop server to steer traffic labeled with the label to the service virtual machine that executes service node 10A.

Similarly, SDN controller 19 re-originates routes with the address prefix to respective VRFs 114A, 114B associated with service nodes 10A, 10B to cause service node 10A to direct traffic destined for the address prefix to service node 10B, and to cause service node 10A to direct traffic destined for the address prefix to PE router 8B. In re-originating the routes using routing protocol messages 107A-107C, SDN controller 19 includes import route targets previously configured for network 106A, VRF 114A, and VRF 114B. For example, SDN controller 19 marks the route in routing protocol message 107A with the route target of 100 that PE router 108A and potentially other PE routers of network 106A are configured to import. As a result, PE router 108A may import the route to prefixes hosted by PE router 108B without being re-configured with a new import target, the route causing PE router 108A to forward traffic received by PE router 108A and destined for the prefix to service node 10A.

Figure 5:
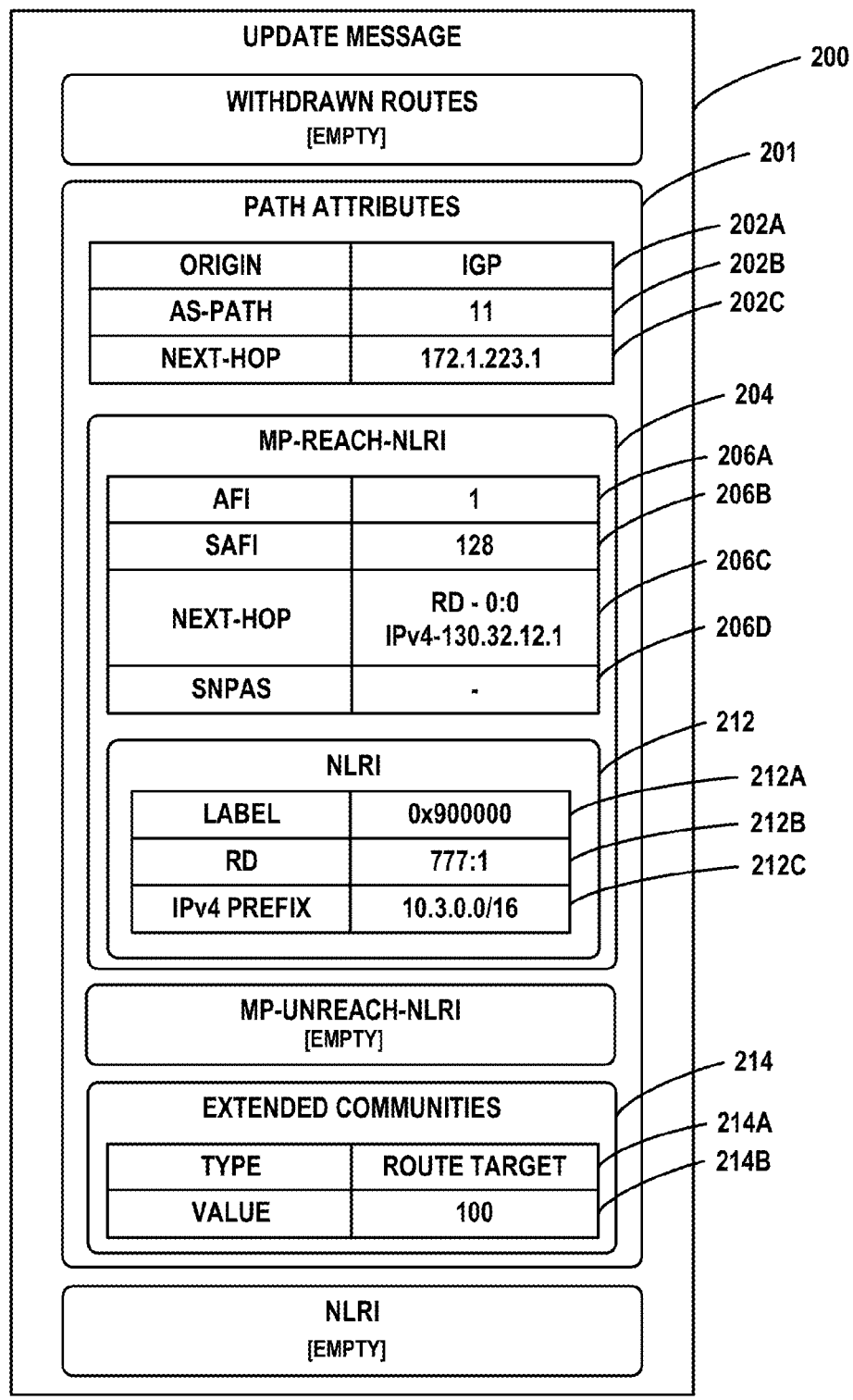
FIG. 5 is a block diagram illustrating a conceptual view of an example routing protocol advertisement generated by a controller in accordance with techniques described herein.

FIG. 5 is a block diagram illustrating a conceptual view of an example routing protocol advertisement generated by a controller in accordance with techniques described herein. In this example, the routing protocol advertisement is a BGP UPDATE message 200 that conforms to MP-BGP and includes MP-REACH-NLRI 204 advertising NLRI for a service node. For illustration purposes, BGP UPDATE message 200 fields and values are described hereinafter with respect to devices of the network system 120 of FIG. 4. BGP UPDATE message 200 may for instance represent an example instance of routing protocol message 107A of FIG. 4. Also for purposes of illustration, BGP UPDATE message 200 is illustrated using glyphs, rather than with packet fields.

BGP UPDATE message 200 includes path attributes 201, which include ORIGIN 202A, AS-PATH 202B, NEXT-HOP 202C, and MP-REACH-NLRI 204. Each of path attributes 201 may comprise a triple <attribute type, attribute length, attribute value> of variable length.

MP-REACH-NLRI 204 of extended BGP UPDATE message 200 specifies an Address Family Identifier (AFI) 206A of 1 in this example to indicate IPv4 network addresses, along with a value for the Subsequent AFI (SAFI) 106B of 128 to identify the NLRI 212 as an MPLS-labeled VPN-IPv4 address defined by the AFI/SAFI combination 1/128. AFI 206A and SAFI 206B may in some instances have different values, as assigned by a private party or by IRNA. MP-REACH-NLRI 204 also specifies a VPN NEXT-HOP 206C that is a combination of a route distinguisher (RD) and an IPv4 prefix.

MP-REACH-NLRI 204 further includes NLRI 212 to identify a reachable IPv4 prefix 212C and provide the MPLS label 212A to identify the VRF for the prefix on a virtual router that has the VRF and thus provides access or applies services to traffic destined for the prefix 212C.

In accordance with techniques described herein, a controller, such as SDN controller 19, may receive an MPLS-labeled VPN-IPv4 address prefix for a network. The network may in some examples host the prefix. To provision a link of a service chain, SDN controller 19 advertises a route for the address prefix into another network to cause devices of the network to import the route and to direct traffic destined for the address prefix to a service node.

For example, as described with respect to FIG. 4, SDN controller 19 may receive an IPv4 prefix reachable by PE router 108B. The IPv4 prefix may have an associated route distinguisher and further be associated with a label and a next hop for CE 110B or VM 116B, for instance, and therefore represent an MPLS-labeled VPN-IPv4 address prefix. To re-originate the prefix in network 106A so as to direct traffic destined for the, SDN controller 19 may generate extended BGP UPDATE message 200. SDN controller 19 generates BGP UPDATE message 200 such that the value of NEXT-HOP 202C may specify a real server or controller that executes service node 10A. Within MP-REACH-NLRI 202, NEXT-HOP 206C may specify an IPv4 address for a virtual machine. In cases in which the service node 10A is not virtualized, the NEXT-HOP 206C and the NEXT-HOP 202C may specify the same IPv4 prefix. SDN controller 19 further generates BGP UPDATE message 200 such that the label 212 in NLRI 212 for the prefix 212C (the prefix reachable by PE router 108B and being re-originated), rather than identifying network 106B to a real or virtual PE router, instead identifies VRF 114A having service node 10A. In this way, a PE router for service node 10A may properly identify VRF 114A and forward traffic to service node 10A for application of a service provided by the service node 10A.

SDN controller 19 further generates BGP UPDATE message 200 in a manner to cause PE router 108A to import the MP-REACH-NRLI 204. For instance, the SDN controller 19 stores configuration data specifying import route target 100 PE router 108A, and SDN controller 19 sets an extended community attribute 214 to include a route target 214A with a value 214B of 100. In other words, SDN controller 19 marks MP-REACH-NRLI 204 with RT=100.

SDN controller 19 re-originates the prefix for network 106B and represented in MP-REACH-NLRI 204 in network 106A using, in this example, a BGP session with PE router 108A. SDN controller 19 sends BGP UPDATE 200 to PE router 108A via the BGP session, e.g., as routing protocol message 107A. By generating and advertising BGP UPDATE message 200 in a manner that marks the MP-REACH-NRLI 204 with an import route target for PE router 108A, the SDN controller 19 causes PE router 108A to import MP-REACH-NRLI 204. PE router 108A may thereafter direct traffic directed to the IPv4 prefix 212C along service path 123 to service node 10A.

Figure 6:
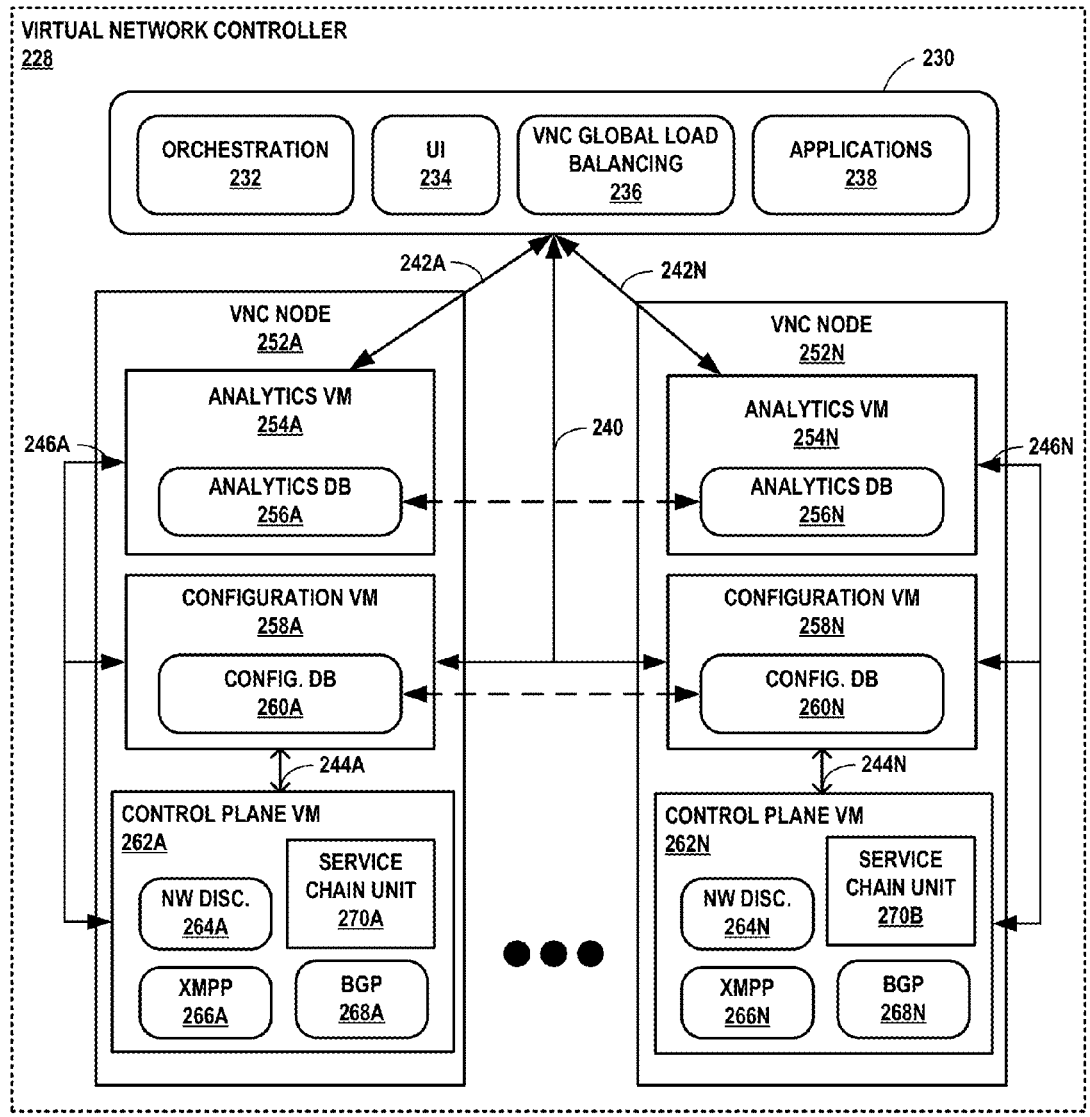
FIG. 6 illustrates an example controller operating according to techniques described herein and in further detail.

FIG. 6 illustrates an example controller operating according to techniques described herein and in further detail. Virtual network controller (VNC) 228 may represent an example instance of SDN controller 19 of FIGS. 1-4. Although illustrated and described as a physically distributed and "virtual" network controller, some examples of VNC 228 may be both physically and logically centralized within an appliance or server.

Figure 7:
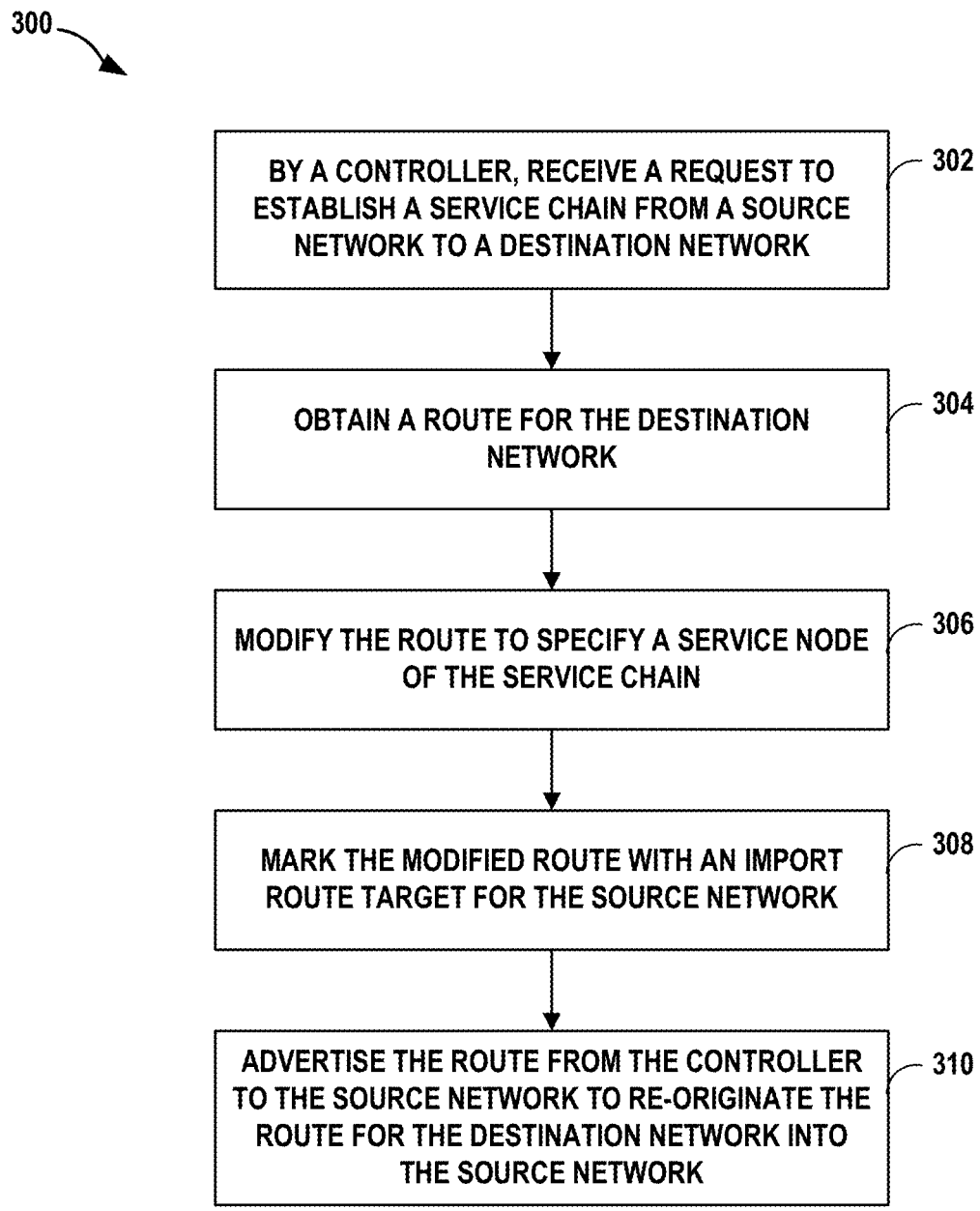
FIG. 7 is a flowchart illustrating an example mode of operation for a controller according to techniques described in this disclosure.

As illustrated in the example of FIG. 7, virtual network controller (VNC) 228 includes one or more virtual network controller ("VNC") nodes 252A-252N (collectively, "VNC nodes 252"). Each of VNC nodes 252 may represent any of VNC nodes 80 of virtual network controller 22 of FIG. 4. VNC nodes 252 that peer with one another according to a peering protocol operating over a network, which may represent an example instance of a switch fabric or L2/L3 IP fabric. In the illustrated example, VNC nodes 252 peer with one another using a Border Gateway Protocol (BGP) implementation, an example of a peering protocol. In this sense, VNC nodes 252A and 252N may represent a first controller node device and a second controller node device peered using a peering protocol. VNC nodes 252 include respective network discovery modules 264A-264N to discover network elements of the network.

VNC nodes 252 provide, to one another using the peering protocol, information related to respective elements of the virtual network managed, at least in part, by the VNC nodes 252. For example, VNC node 252A may manage a first set of one or more servers operating as virtual network switches for the virtual network. VNC node 252A may send information relating to the management or operation of the first set of servers to VNC node 252N by BGP 268A. Other elements managed by VNC nodes 252 may include network controllers and/or appliances, network infrastructure devices (e.g., L2 or L3 switches), communication links, firewalls, and VNC nodes 252, for example. Because VNC nodes 252 have a peer relationship, rather than a master-slave relationship, information may be sufficiently easily shared between the VNC nodes 252. In addition, hardware and/or software of VNC nodes 252 may be sufficiently easily replaced, providing satisfactory resource fungibility.

Each of VNC nodes 252 may include substantially similar components for performing substantially similar functionality, said functionality being described hereinafter primarily with respect to VNC node 252A. VNC node 252A may include an analytics database 256A for storing diagnostic information related to a first set of elements managed by VNC node 252A. VNC node 252A may share at least some diagnostic information related to one or more of the first set of elements managed by VNC node 252A and stored in analytics database 256, as well as to receive at least some diagnostic information related to any of the elements managed by others of VNC nodes 252. Analytics database 256A may represent a distributed hash table (DHT), for instance, or any suitable data structure for storing diagnostic information for network elements in a distributed manner in cooperation with others of VNC nodes 252. Analytics databases 256A-256N (collectively, "analytics databases 256") may represent, at least in part, one of distributed databases 82 of distributed virtual network controller 22 of FIG. 4.

VNC node 252A may include a configuration database 260A for storing configuration information related to a first set of elements managed by VNC node 252A. Control plane components of VNC node 252A may store configuration information to configuration database 260A using interface 240A, which may represent an Interface for Metadata Access Points (IF-MAP) protocol implementation. VNC node 252A may share at least some configuration information related to one or more of the first set of elements managed by VNC node 252A and stored in configuration database 260A, as well as to receive at least some configuration information related to any of the elements managed by others of VNC nodes 252. Configuration database 260A may represent a distributed hash table (DHT), for instance, or any suitable data structure for storing configuration information for network elements in a distributed manner in cooperation with others of VNC nodes 252. Portions of RIBs may be stored by control nodes to facilitate operation of network discovery modules and BGPs 268.

Virtual network controller 228 may perform any one or more of the illustrated virtual network controller operations represented by modules 230, which may include orchestration 232, user interface 234, VNC global load balancing 236, and one or more applications 238. VNC 228 executes orchestration module 232 to facilitate the operation of one or more virtual networks in response to a dynamic demand environment by, e.g., spawning/removing virtual machines in data center servers, adjusting computing capabilities, allocating network storage resources, and modifying a virtual topology connecting virtual switches of a virtual network. VNC global load balancing 236 executed by VNC 228 supports load balancing of analytics, configuration, communication tasks, e.g., among VNC nodes 252. Applications 238 may represent one or more network applications executed by VNC nodes 252 to, e.g., change topology of physical and/or virtual networks, add services, or affect packet forwarding.

User interface 234 includes an interface usable to an administrator (or software agent) to control the operation of VNC nodes 252. For instance, user interface 234 may include methods by which an administrator may modify, e.g. configuration database 260A of VNC node 252A. Administration of the one or more virtual networks operated by VNC 228 may proceed by uniform user interface 234 that provides a single point of administration, which may reduce an administration cost of the one or more virtual networks.

VNC node 252A may include a control unit such as a control plane virtual machine (VM) 262A that executes control plane protocols to control and monitor a set of network elements. Control plane VM 262A may in some instances represent a native process. In the illustrated example, control VM 262A executes BGP 268A to provide information related to the first set of elements managed by VNC node 252A to, e.g., control plane virtual machine 262N of VNC node 252N. Control plane VM 262A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 262A-262N) may execute different software versions. In one or more aspects, e.g., control plane VM 262A may include a type of software of a particular version, and the control plane VM 262N may include a different version of the same type of software. The peering configuration of the control node devices may enable use of different software versions for the control plane VMs 262A-262N. The execution of multiple control plane VMs by respective VNC nodes 252 may prevent the emergence of a single point of failure.

Control plane VM 262A may communicate with physical and virtual routers using a communication protocol. Virtual routers or switches facilitate overlay networks in one or more virtual networks. In the illustrated example, control plane VM 262A uses Extensible Messaging and Presence Protocol (XMPP) 266A to communicate with at least one virtual router for a virtual network. Virtual network route data, statistics collection, logs, and configuration information may in accordance with XMPP 266A be sent as XML documents for communication between control plane VM 262A and the virtual routers. Control plane VM 262A may in turn route data to other XMPP servers (such as an analytics collector) or may retrieve configuration information on behalf of one or more virtual network switches. Control plane VM 262A may further execute a communication interface 240A for communicating with configuration virtual machine (VM) 258A associated with configuration database 260A. Communication interface 240A may represent an IF-MAP interface.

VNC node 252A may further include configuration VM 108A to store configuration information for network elements and to manage configuration database 260A. Configuration VM 258A, although described as a virtual machine, may in some aspects represent a native process executing on an operating system of VNC node 252A. Configuration VM 258A and control plane VM 262A may communicate using IF-MAP by communication interface 244A using XMPP. In some aspects, configuration VM 288A may include a horizontally scalable multi-tenant IF-MAP server and a distributed hash table (DHT)-based IF-MAP database that represents configuration database 260A. In some aspects, configuration VM 258A may include a configuration translator, which may translate a user friendly higher-level virtual network configuration to a standards based protocol configuration (e.g., a BGP L3VPN configuration), which may be stored using configuration database 260A. Communication interface 240 may include an IF-MAP interface for communicating with other network elements. The use of the IF-MAP may make the storage and management of virtual network configurations very flexible and extensible given that the IF-MAP schema can be dynamically updated. Advantageously, aspects of virtual network controller 228 may be flexible for new applications 238.

VNC node 252A may further include an analytics virtual machine (VM) 254A to store diagnostic information (and/or visibility information) related to at least the first set of elements managed by VNC node 252A. Control plane VM and analytics VM 254 may communicate using an XMPP implementation by communication interface 246A. Analytics VM 254A, although described as a virtual machine, may in some aspects represent a native process executing on an operating system of VNC node 252A.

Analytics VM 254A may include analytics database 256A, which may store visibility data for virtual networks. Visibility information may describe visibility of both distributed VNC 228 itself and of customer networks. The distributed database may include an XMPP interface on a first side and a REST/JASON/XMPP interface on a second side.

Virtual routers may controlled by VNC 228 implement the layer 3 forwarding and policy enforcement point for one or more end points and/or one or more hosts. The one or more end points or one and/or one or more hosts may be classified into a virtual network due to configuration from control plane VM 262A. Control plane VM 262A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). A virtual router may be agnostic to actual tunneling encapsulation used. A virtual router may also trap interesting layer 2 (L2) packets, broadcast packets, and/or implement proxy for the packets, e.g. using one of Address Resolution Protocol (ARP), Dynamic Host Configuration Protocol (DHCP), Domain Name Service (DNS), etc.

In some cases, different VNC nodes 252 may be provided by different suppliers. However, the peering configuration of VNC nodes 252 may enable use of different hardware and/or software provided by different suppliers for implementing the VNC nodes 252 of distributed VNC 228. A system operating according to the above may provide logical view of network topology to end-host irrespective of physical network topology, access type, and/or location. Distributed VNC 228 provides programmatic ways for network operators and/or applications to change topology, to affect packet forwarding, and/or to add services, as well as horizontal scaling of network services, e.g. firewall, without changing the end-host view of the network.

Any of the virtual network controller operations represented by modules 230 may direct/request VNC nodes 252 to establish a service chain for steering traffic, from a source network to a destination network, through a sequence of service nodes 10. UI 234, for instance, may receive a client request to create a service chain for client traffic. As another example, one of applications 238 may request a service chain for application traffic for the application.

Control plane VMs 262A-260N also include respective service chain units 270A-270N that implement service chains in accordance with techniques described in this disclosure. Operations of service chain units 270A-270N are described hereinafter with respect to service chain unit 270A for ease of description purposes. Service chain unit 270A monitors routes obtained by control plane VMs 262 via BGPs 268 from networks of elements controlled by VNC 228 as well as, in some instances, routes generated by VNC 228 for configuring the elements.

In accordance with techniques described herein, service chain unit 270A may establish requested service chains in part by modifying and re-originating routes into networks of elements controlled by VNC 228. For example, to direct traffic from a source network to a destination network via a service node, service chain unit 270A may obtain a route from the destination network, modify the route to replace a next-hop and (in some cases) a label to specify the service node, and re-originate the modified route into the source network. To re-originate the modified route into the source network, the service chain unit 270A may use BGP 268A to send the modified route marked with a route target that is an import route target for the source network. In this way, VNC 228 causes the source network to import the modified route and the source network directs traffic to the destination network via the service node as a result.

FIG. 7 is a flowchart illustrating an example mode of operation for a controller according to techniques described in this disclosure. While described with respect to SDN controller 19 of FIG. 1, example mode of operation 300 may be applied by any controller, server, appliance, management system, or other suitable network device, to perform techniques described herein.

SDN controller 19 receives a request that defines a service chain for steering traffic from a source network to a destination network via a service node (302). Network 106A may represent the source network, network 106B the destination network, and service node 10 the service node. SDN controller 19 may obtain (e.g., store, generate, or receive) a route for the destination network that specifies a next hop for the destination network (304). SDN controller 19 modifies the next hop of the route to specify the service node (306). Modifying the next hop may include setting a physical address for a service that hosts the service node and, in some instances, setting a label that identifies a routing instance associated with the service node to a router. SDN controller 19 may then re-originate the modified route by sending a routing protocol advertisement to the source network, the routing protocol advertisement including the modified route and marked with an import route target for the source network (308-310). As a result, PE routers of the source network import the advertised, modified route and direct traffic destined for the destination network to the service node for application of a service.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   obtaining, by a controller and from a router in a first network, a route that specifies a next hop to an address prefix reachable by the first network, wherein the route is not associated with an import route target configured for a provider edge router of a second network;
   generating, by the controller, a modified route that modifies the next hop of the route to specify a service node as the next hop to the address prefix, wherein the service node and the controller are separate devices; and
   sending, by the controller, the modified route to the second network, the modified route marked with the import route target configured for the provider edge router of the second network so that traffic from the second network and destined for the address prefix is forwarded to the service node.

2. The method of claim 1, wherein the modified route marked with the import route target configured for the provider edge router of the second network causes the provider edge router of the second network to import the modified route and forward, according to the modified route, traffic destined for the address prefix to the service node.

3. The method of claim 1, wherein sending the modified route to the second network comprises:
   generating, by the controller, a routing protocol advertisement that conforms to a routing protocol, the routing protocol advertisement including the modified route marked with the import route target configured for the provider edge router of the second network; and
   sending the routing protocol advertisement from the controller to the second network.

4. The method of claim 1, wherein sending the modified route to the second network comprises:
   generating, by the controller, a Border Gateway Protocol (BGP) UPDATE message that conforms to a BGP, the BGP UPDATE message including the modified route and including an extended community attribute for a route target that specifies the import route target configured for the provider edge router of the second network; and
   sending, from the controller to a router of the second network via a BGP session with the router of the second network, the BGP UPDATE message.

5. The method of claim 1, wherein generating the modified route that specifies the service node as the next hop to the address prefix comprises:
   generating, by the controller, the modified route to specify a network address for network device that applies the service for the service node as the next hop.

6. The method of claim 1, wherein generating the modified route that specifies the service node as the next hop to the address prefix comprises:
   generating, by the controller, the modified route to specify a virtual network identifier that identifies a routing instance that includes the service node.

7. The method of claim 1,
   wherein the first network comprises a virtual private network,
   wherein the route comprises a Multiprotocol Label Switching (MPLS)-labeled virtual private network (VPN)-IPv4 prefix for the virtual private network, and
   wherein generating the modified route that specifies the service node as the next hop to the address prefix comprises:
   generating, by the controller, the modified route to specify a network address for a network device that hosts the service node; an MPLS label that identifies, to a virtual router of the network device, a routing instance for the service node; and a virtual private network address for a virtual machine that is hosted by the network device and executes the service node.

8. The method of claim 1,
   wherein the second network comprises a virtual private network, and
   wherein the provider edge router comprises a physical gateway router that connects the virtual private network to a physical network coupled to the gateway router.

9. The method of claim 1, wherein the controller is not capable of configuring import route targets of the provider edge router of the second network.

10. The method of claim 1, further comprising:
    receiving, by the controller, a request to provision a service chain for the traffic from the second network and destined for the address prefix, wherein the service chain comprises the service node; and
    selecting, by the controller based on the request, the import route target configured for the provider edge router of the second network,
    wherein sending the modified route to the second network comprising sending, by the controller, the modified route to the second network to provision the service chain.

11. A controller comprising:
    one or more processors;
    a control unit configured to obtain, from a router in a first network, a route that specifies a next hop to an address prefix reachable by the first network, wherein the route is not associated with an import route target configured for a provider edge router of a second network; and a service chain unit configured to generate a modified route modifies the next hop of the route to specify a service node as the next hop to the address prefix, wherein the service node is external to the first network, and wherein the control unit is further configured to send the modified route to a second network, the modified route to the second network, the modified route marked with the import route target configured for the provider edge router of the second network so that traffic from the second network and destined for the address prefix is forwarded to the service node.

12. The controller of claim 11, wherein the modified route marked with the import route target causes the provider edge router of the second network to import the modified route and forward, according to the modified route, traffic destined for the address prefix to the service node.

13. The controller of claim 11, wherein to send the modified route to the second network the control unit is further configured to:

generate a routing protocol advertisement that conforms to a routing protocol, the routing protocol advertisement including the modified route marked with the import route target; and send the routing protocol advertisement from the controller to the second network.

14. The controller of claim 11, wherein to send the modified route to the second network the control unit is further configured to:

generate a Border Gateway Protocol (BGP) UPDATE message that conforms to a BGP, the BGP UPDATE message including the modified route and including an extended community attribute for a route target that specifies the import route target; and send, to a router of the second network via a BGP session with the router of the second network, the BGP UPDATE message.

15. The controller of claim 11, wherein to generate the modified route that specifies the service node as the next hop to the address prefix the service unit is further configured to:

generate the modified route to specify a network address for network device that applies the service for the service node as the next hop.

16. The controller of claim 11, wherein to generate the modified route that specifies the service node as the next hop to the address prefix the service unit is further configured to:

generate the modified route to specify a virtual network identifier that identifies a routing instance that includes the service node.

17. The controller of claim 11, wherein the first network comprises a virtual private network, wherein the route comprises a Multiprotocol Label Switching (MPLS)-labeled virtual private network (VPN)-IPv4 prefix for the virtual private network, and wherein to generate the modified route that specifies the service node as the next hop to the address prefix the service unit is further configured to:

generate the modified route to specify a network address for a network device that hosts the service node; an MPLS label that identifies, to a virtual router of the network device, a routing instance for the service node; and a virtual private network address for a virtual machine that is hosted by the network device and executes the service node.

18. The controller of claim 11, wherein the second network comprises a virtual private network, and wherein the provider edge router comprises a physical gateway router that connects the virtual private network to a physical network coupled to the gateway router.

19. The controller of claim 11, wherein the controller is not capable of configuring import route targets of the provider edge router of the second network.

20. A non-transitory computer-readable medium comprising instructions for causing one or more programmable processors to:

obtain, by a controller and from a router in a first network, a route that specifies a next hop to an address prefix reachable by the first network, wherein the route is not associated with an import route target configured for a provider edge router of a second network;

generate, by the controller, a modified route that modifies the next hop of the route to specify a service node as the next hop to the address prefix, wherein the service node is external to the first network; and send, by the controller, the modified route to the second network, the modified route marked with the import route target configured for the provider edge router of the second network so that traffic from the second network and destined for the address prefix is forwarded to the service node.

* * * * *